(12) United States Patent
Curran

(10) Patent No.: US 7,735,850 B1
(45) Date of Patent: Jun. 15, 2010

(54) QUICK DISCONNECT BALL MOUNT

(75) Inventor: Eugene M. Curran, Madison Township, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/900,140

(22) Filed: Sep. 4, 2007

(51) Int. Cl.
*B60D 1/00* (2006.01)
(52) U.S. Cl. .................................. 280/511; 280/504
(58) Field of Classification Search ............... 280/511, 280/507, 504, 515, 514
See application file for complete search history.

(56) References Cited

U.S. PATENT DOCUMENTS

| | | | | |
|---|---|---|---|---|
| 3,658,363 A | * | 4/1972 | Marler | 280/511 |
| 3,794,356 A | * | 2/1974 | Hollis, Jr. | 280/513 |
| 5,725,234 A | * | 3/1998 | Colibert | 280/512 |
| 7,017,925 B2 | * | 3/2006 | Lindsay | 280/124.1 |
| 7,425,016 B2 | * | 9/2008 | Bowsher et al. | 280/504 |

* cited by examiner

*Primary Examiner*—Tony H. Winner
(74) *Attorney, Agent, or Firm*—Michael Zelenka; Stephen J. Harbulak

(57) ABSTRACT

A trailer quick disconnect ball mount assembly provides a more secure, less cumbersome, more visible and better-fitting connection between the towing vehicle and trailer. The trailer quick disconnect ball mount assembly features a receiver housing with an angled sidewall that defines a tapered opening for rapid and precise alignment of the ball inside the receiver housing. The receiver housing, angled sidewall and fastening pins only cooperate only when the ball is correctly seated inside the receiver housing and also prevents accumulations of dust and dirt. The need for correctly seating the ball allows the user to instantly determine that the ball is securely connected to the receiver housing. A trailer quick disconnect ball mount system and a method for securely hitching a trailer with a quick disconnect ball mount assembly are also provided.

14 Claims, 3 Drawing Sheets

QUICK DISCONNECT BALL MOUNT

GOVERNMENT INTEREST

The invention described herein may be manufactured, used, imported, sold, and licensed by or for the Government of the United States of America without the payment to me of any royalty thereon.

FIELD OF THE INVENTION

The present invention relates to trailer hitches for motor vehicles. More particularly, the present invention relates to devices and methods providing a quick disconnect ball mount.

BACKGROUND OF THE INVENTION

Trailer hitches have found wide-spread use in all phases of ground transportation and can pull boats, campers, cargo trailers and many other types of loads. There are several types of trailer hitches. Most pickup trucks, sport utility vehicles and commercial trucks have the ball trailer hitch. Other types of trailer hitches are gooseneck trailer hitches and fifth wheel hitches. Ball trailer hitches are more versatile than many other types and can be used to haul small cargo trailers, boats and some campers. It is important to have a strong enough truck to haul the load connected to the trailer hitch so the trailer is usually pulled by a truck with adequate engine strength to build up momentum to pull the trailer.

Trailer hitches provide great versatility for recreational, commercial and military transportation throughout the world. Except for the trailer and cargo, the typical ball trailer hitch system comprises three main assemblies: the trailer ball, ball mount and receiver. The trailer ball is the component that attaches the trailer to the hitch. The ball mount is that part of the trailer hitch that slides into the receiver and fastens onto the trailer ball. The receiver is that part of the trailer hitch that is attached to the frame of the towing vehicle. Notwithstanding the many versatile uses and valuable contributions of trailers to today's transportation systems, many difficulties can arise from a poor connection between the ball mount, ball and receiver such as accidents, lost cargo and property damage. Trailer hitches must be installed correctly to the truck or else the entire hitch rig can come off, leaving the cargo behind and causing many problems and concerns. Additionally, in tactical military operations conducted in Iraq and Afghanistan, a loose trailer connection on a military vehicle may well slow down the military vehicle or convoy and expose the troops to the terrible dangers of roadside explosions.

One disadvantage with current trailer receivers is that they are designed in such a way that they easily collect dust, sand and dirt. For example, trailer hitches used by military vehicles in Southwest Asia are frequently hampered by excessive accumulation of desert sand which is trapped by a lip near the interior bottom of the receiver. The unwanted build-up of sand and dirt in the receiver has been a contributing factor to poor trailer connections. Also, current trailer hitch receivers have a relatively small opening so that making a tight-fitting connection between the ball and receiver can be a time-consuming process that requires a precise alignment of the ball and receiver, which can also create dangerous complications on the road or during a tactical military mission in a hostile environment. Another problem with current trailer hitch systems is that the typical ball receiver usually has a somewhat large tolerance within the receiver which tends to pull the ball into the side of the receiver and causes an uneven placement of the ball within the receiver and can result in poor fit and loosened connections during travel. Another disadvantage with the current trailer hitch systems is that they rely upon a latching mechanism that is located inside the hitch and consequently hidden from view so that the user is unable to quickly determine if the ball is properly connected and secured. The combined impact of the disadvantages of excessive road dust collection, cumbersome alignment procedures, poor fit and lack of visibility in current trailer hitches causes many losses of time, cargo and efficiency.

Thus there has been a long-felt need for more secure trailer hitch connections that do not suffer from the disadvantages, drawbacks and shortcomings of prior art trailer hitches. Up until now, this long-felt need for a new trailer hitch structure for more secure, less cumbersome, more visible and better-fitting connections has not been answered.

SUMMARY OF THE INVENTION

In order to answer the long-felt need for more secure trailer hitch connections that do not suffer from the disadvantages, drawbacks and shortcomings of excessive road dust collection, cumbersome alignment procedures, poor fit and lack of visibility, the present invention provides a trailer quick disconnect ball assembly that is more secure, less cumbersome, more visible and provides a better-fitting connection. This invention's trailer quick disconnect ball assembly answers these long-felt needs with a new receiver housing having a spherical portion and a tapered opening to prevent accumulations of dust and dirt and allow rapid and precise alignment of the ball inside the receiver housing with a means for fastening that cooperate when the ball is correctly seated allowing the user to instantly determine that the ball is securely connected to the receiver housing.

Accordingly, it is an object of the present invention to provide a more secure trailer hitch with a receiver housing having a spherical portion and a tapered opening.

It is another object of the present invention to provide a more secure trailer hitch with a trailer quick disconnect ball mount assembly receiver housing having a spherical portion, a tapered opening and a fastening means that only cooperate when the ball is correctly seated.

It is still a further object of the present invention to provide a more secure trailer hitch with a trailer quick disconnect ball mount assembly with a receiver housing having a spherical portion, a tapered opening and a fastening means that only cooperate when the ball is correctly seated allowing for a more secure, less cumbersome, more visible and better-fitting connection.

The present invention in one preferred embodiment is directed to a trailer quick disconnect sand-resistant ball mount assembly, comprising a receiver housing having a receiver chamber, a rear mounting plate and a plurality of receiver side openings; the receiver chamber having a closed spherical upper portion and an angled sidewall; the rear mounting plate having a plurality of mounting apertures to attach the receiver housing to a towing vehicle; a trailer hitch ball assembly having a ball and a shaft are connected to a towed vehicle, the shaft protruding downward; the upper portion and the angled sidewall, being dimensioned to permit a precise alignment of the ball inside the receiver chamber, holds the ball within the receiver chamber while providing a full range of motion for the towed vehicle; a pair of means for fastening extends through the receiver side openings, into the receiver chamber and fits snugly underneath the ball to securely hold the ball inside the receiver chamber, each of the fastening means having a latch pin; the upper portion and the angled sidewall, being tapered upward, cause an unwanted accumulation of sand, road dust, and other debris to harmlessly drop downward during towing to prevent the unwanted accumulation of sand, road dust, and other debris from collecting inside the receiver chamber; the receiver chamber and the ball being configured to prevent any unwanted dropping of the assembly during towing; the rear mounting plate being shaped to afford a best fit between the towed vehicle and the towing vehicle; and the upper portion, the angled sidewall and the pair of fastening means being configured to allow rapidly disconnecting the trailer hitch ball assembly by depressing the latch pins and then slidably removing the pair of fastening means from the plurality of receiver side openings.

It is yet another object of the present invention to provide a method for securely hitching a trailer with a quick disconnect ball assembly with a receiver housing, angled sidewall that tapers upward and a fastening means for a more secure, less cumbersome, more visible and better-fitting connection.

These and other objects and advantages are accomplished by this invention's trailer hitch quick disconnect ball mount assembly comprising a new receiver housing with a spherical portion and a tapered opening to prevent accumulations of dust and dirt and allow rapid and precise alignment of the ball inside the receiver housing, fastening means that cooperate when the ball is correctly seated allowing the user to instantly verify that the ball is securely connected to the receiver housing providing for a more secure, less cumbersome, more visible and better-fitting connection without suffering from the disadvantages, drawbacks and shortcomings of prior art trailer hitches. The present invention encompasses a trailer quick disconnect ball mount assembly, a trailer hitch quick disconnect ball mounting system and a method for securely hitching a trailer with a quick disconnect ball mount assembly.

BRIEF DESCRIPTION OF THE DRAWINGS

FIG. 3 is a perspective view of the complete trailer quick disconnect ball mount assembly of the present invention; and.

DETAILED DESCRIPTION OF THE DRAWINGS

Figure 1A:
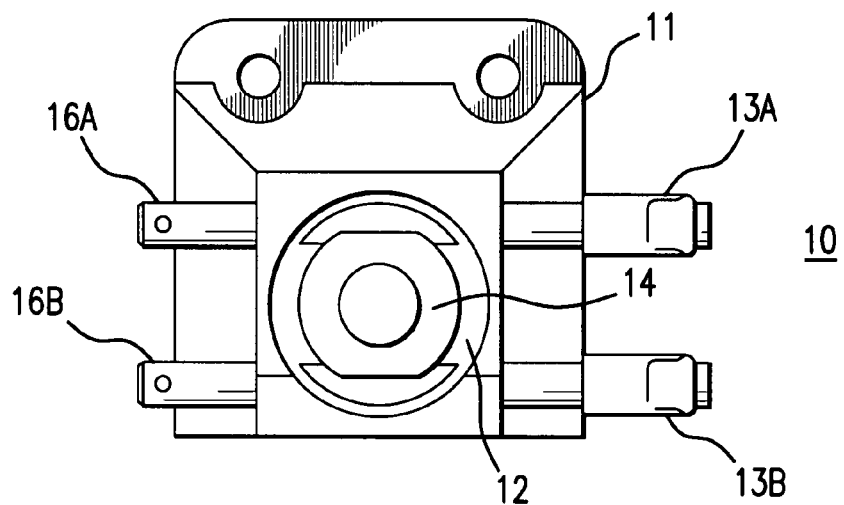
FIG. 1A is a top cross-sectional view of the receiver of the trailer quick disconnect ball mount assembly of the present invention.

Referring now to the drawings, FIG. 1A is a top cross-sectional view of the trailer quick disconnect ball mount assembly 10 of the present invention further comprising a receiver housing 11, a receiver chamber 12 and a pair of means for fastening 13A and 13B. The fastening means 13A and 13B, which could be a pair of keeper pins, extend inside the receiver chamber 12 and fit underneath the ball 14 of the trailer hitch ball assembly 15 to firmly hold the ball 14 inside the receiver chamber 12 and prevent any unwanted dropping of the trailer hitch ball assembly 15. The fastening means 13A and 13B also include a set of latch pins 16A and 16B to prevent them from sliding out of receiver side openings, which are shown in other drawings.

Figure 1B:
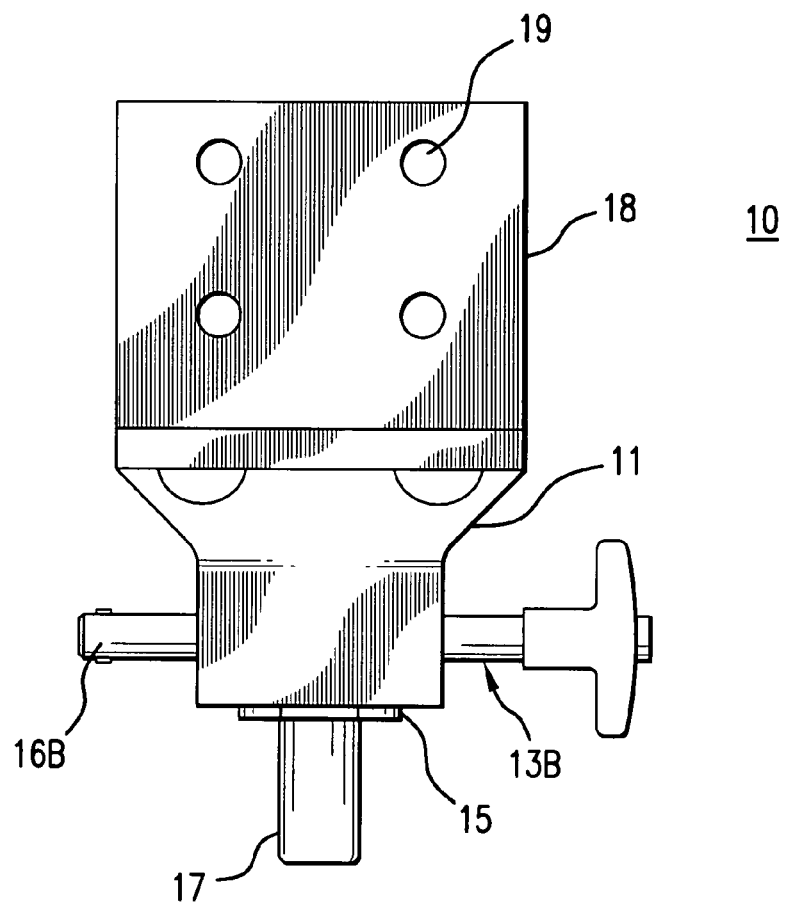
FIG. 1B is a rear view of the receiver of the trailer quick disconnect ball mount assembly of the present invention.

FIG. 1B is a front view of the receiver housing 11 of the trailer quick disconnect ball mount assembly 10 of the present invention, using like numerals for like structural elements, depicting the receiver housing 11 with a rear mounting plate 18. The rear mounting plate 18 further comprises a plurality of mounting apertures 19 for attaching the receiver housing 11 to the towing vehicle. Fastening means 13B is shown inserted into the receiver housing 11. FIG. 1B also shows the trailer hitch ball assembly 15 with a shaft 17 that protrudes downward and is attached to the towed vehicle. Rear mounting plate 18 is depicted as being flat in these drawings; however, the mounting plate 18 can be modified into an angled, curved or other shape that affords the best fit between the trailer and the towing vehicle.

Figure 2:
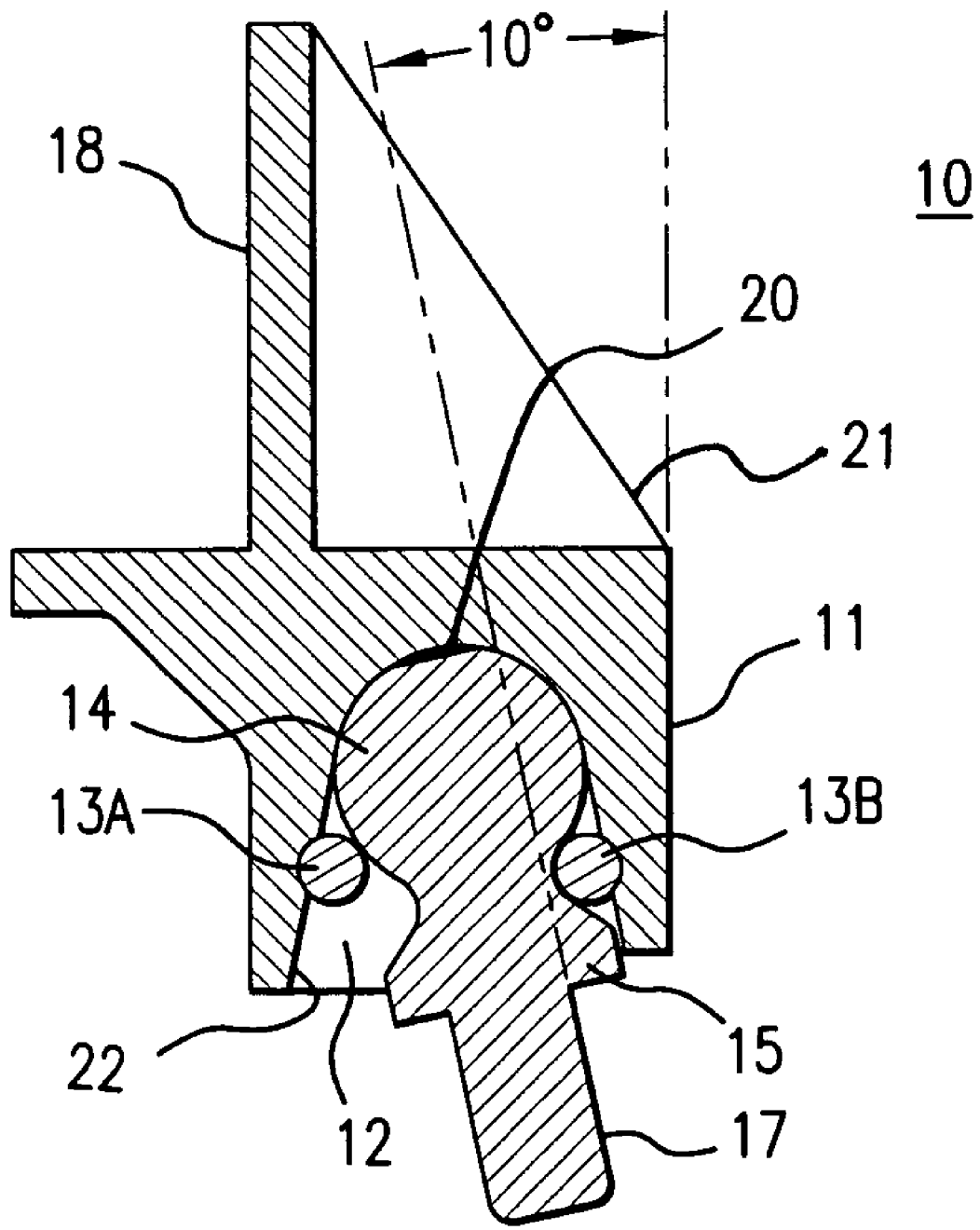
FIG. 2 is a side view of the trailer quick disconnect ball mount assembly of the present invention in operation.

FIG. 2 is a cross-sectional side view of the trailer quick disconnect ball mount assembly 10 of the present invention in operation, using like numerals for like structural elements. The trailer hitch ball assembly 15 is shown with the ball 14 firmly seated within a spherical upper portion 20 of the receiver chamber 12. The mounting plate 18 is shown perpendicular to the housing 11 and is attached to a support member 21 for additional strength. Also depicted are the fastening means 13A and 13B positioned inside the receiver chamber 12 and fitting snugly underneath the ball 14 of the trailer hitch ball assembly 15 cooperating with other elements to securely hold the ball 14 in place and prevent unwanted loosening or dropping of the trailer hitch ball assembly 15 and towed cargo.

This invention's uniquely shaped receiver chamber 12 and the fastening means 13A and 13B advantageously combine the ability to securely hold the ball 14 inside the receiver chamber 12 with the fastening means 13A and 13B and to quickly disengage the trailer hitch ball assembly 15 from the receiver housing 11. The receiver chamber 12 includes the upper spherical portion 20 that is designed to securely hold the ball 14 within the receiver chamber 12 and an angled sidewall 22 that tapers upwards to define a tapered opening. The angled sidewall 22 also allows dirt, sand and other road debris to harmlessly drop out of the receiver chamber 12 during towing and prevents the unwanted and hazardous accumulation of dust, dirt and sand inside the receiver chamber 12. The angled sidewall 22 also permits an adequate range of motion during towing, additional room for the ball 14 to be more easily and precisely aligned inside the upper spherical portion 20 and additional room for rapid and easy disconnecting and removal of the trailer hitch assembly 15. The trailer hitch ball assembly 15 is shown at a 10° angle, which is the typical maximum angle during operation with a moving towing vehicle and trailer. The fastening means 13A and 13B are configured to not only hold the ball 14 securely in place within the spherical portion 20 of the receiver housing 12, but also serve as a visual confirmation that the ball 14 is securely seated because they will not properly insert into the receiver housing 12 unless the ball 14 is properly seated. Additionally, the fastening means 13A and 13B also serve as a safety double-check because whenever the fastening means 13A and 13B are removed, the user knows that the trailer is not properly connected. The quick disconnect feature will be described in more detail further below in connection with FIG. 4.

Figure 3:
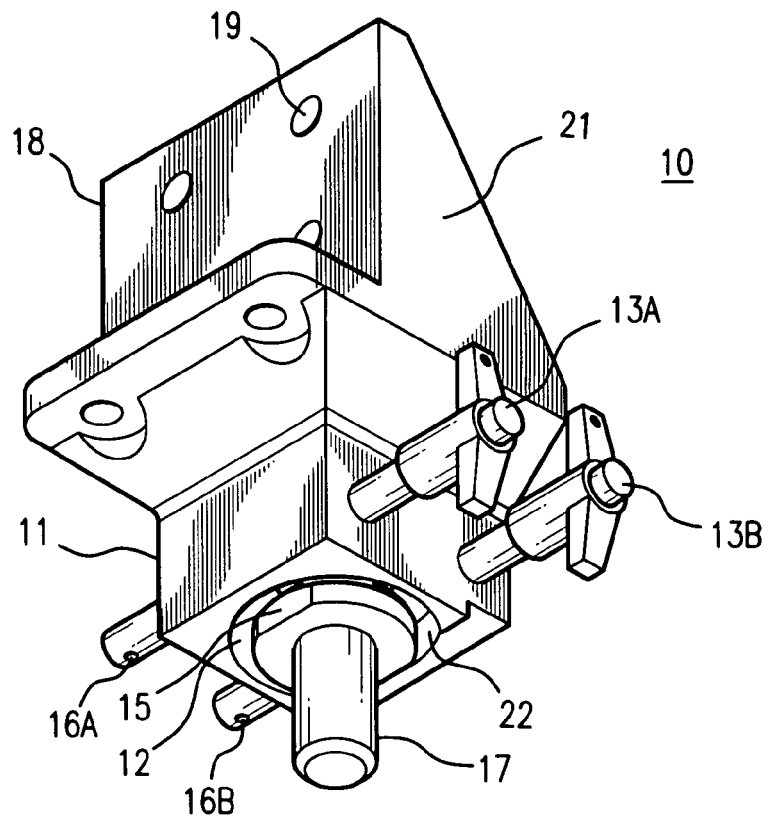

FIG. 3 is a frontal perspective view of the trailer quick disconnect ball mount assembly 10 of the present invention depicting the trailer hitch ball assembly 15 firmly inserted into the receiver chamber 12. The rear mounting plate 18 and support member 21 are on top of the receiver housing 11. Fastening means 13A and 13B are shown inserted into the receiver housing 11 to securely hold the trailer hitch ball assembly 15 inside the upper spherical portion 20 of the receiver housing 11 and cooperate to prevent unwanted loosening or dropping of the trailer hitch ball assembly 15 out of the receiver chamber 12.

Figure 4:
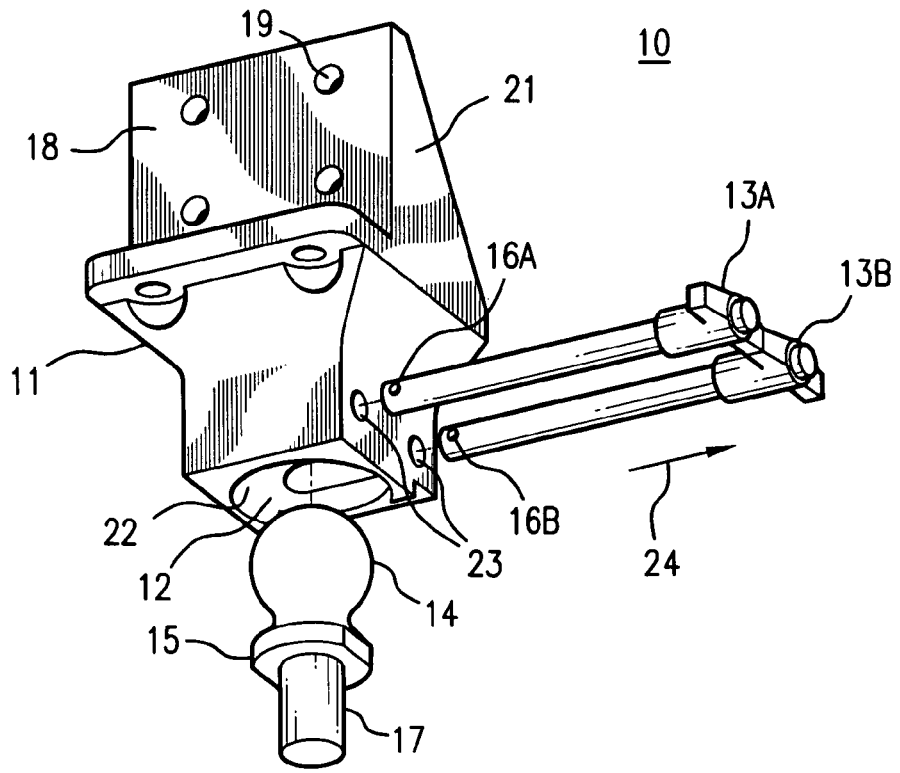
FIG. 4 is a perspective view of the complete trailer hitch quick disconnect ball mount assembly of the present invention showing the fastening means being removed.

FIG. 4 is a perspective view of the trailer quick disconnect ball mount assembly 10 of the present invention showing removal of the fastening means 13A and 13B and the trailer hitch assembly 15 being disengaged from the receiver housing 11. In accordance with the present invention, the fastening means 13A and 13B may be quickly disengaged from the ball 14, receiver chamber 12 and receiver housing 11 by depressing the latch pins 16A and 16B and then slideably removing the fastening means 13A and 13B from the receiver side openings 23 in the same direction as arrow 24.

A number of variations of the present invention are also possible, including positioning the spherical portion 20 in an upper portion of the receiver chamber 12, attaching the ball mount assembly 15 to the towed vehicle with a threaded shaft 17 or making the fastening means 13A and 13B from ball detent pins, hitch pins, keeper pins or bolts. The present invention also contemplates a method for securely hitching a trailer with a quick disconnect ball mount assembly for a more secure, less cumbersome, more visible and better-fitting connection, comprising the steps of forming a receiver housing with a receiver chamber, a rear mounting plate and receiver side openings, the receiver chamber having a spherical upper portion and an angled sidewall; providing the rear mounting plate with mounting apertures to attach the receiver housing to a towing vehicle; forming a trailer hitch ball assembly with a ball and a shaft, with the shaft protruding downward; connecting the shaft to a towed vehicle; dimensioning the upper portion and the angled sidewall to permit a more precise alignment of the ball inside the receiver chamber; inserting the ball into the receiver chamber, the ball being held within the receiver chamber by the upper portion and angled sidewall while providing a full range of motion for the towed vehicle; extending a pair of means for fastening through the receiver side openings and into the receiver chamber; placing the pair of fastening means snugly underneath the ball to securely hold the ball inside the receiver chamber, each of the fastening means having a latch pin; causing road dust and debris to harmlessly drop downward during towing by virtue of the angled sidewall to prevent an unwanted and hazardous accumulation of road dust and debris inside the receiver chamber; and configuring the upper portion, angled sidewall and pair of fastening means to allow rapidly disconnecting the trailer hitch ball assembly by depressing the latch pins and then slideably removing the pair of fastening means from the plurality of receiver side openings.

Many of the variations of the trailer quick disconnect ball mount assembly also apply to this invention's method for securely hitching a trailer with a quick disconnect ball mount assembly. The present invention also encompasses a trailer quick disconnect ball mount system, which can include many of the variations of the trailer quick disconnect ball mount assembly.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

What I claim is:

1. A trailer quick disconnect sand-resistant ball mount assembly, comprising:
   a receiver housing having a receiver chamber, a rear mounting plate and a plurality of receiver side openings, said receiver chamber having a closed spherical upper portion and an angled sidewall;
   said rear mounting plate having a plurality of mounting apertures to attach said receiver housing to a towing vehicle;
   a trailer hitch ball assembly having a ball and a shaft are connected to a towed vehicle, said shaft protruding downward;
   said upper portion and said angled sidewall, being dimensioned to permit a precise alignment of said ball inside said receiver chamber, holds said ball within said receiver chamber while providing a full range of motion for said towed vehicle;
   a pair of means for fastening extends through said receiver side openings, into said receiver chamber and fits snugly underneath said ball to securely hold said ball inside said receiver chamber, each of said fastening means having a latch pin;
   said upper portion and said angled sidewall, being tapered upward, cause an unwanted accumulation of sand, road dust, and other debris to harmlessly drop downward during towing to prevent said unwanted accumulation of sand, road dust, and other debris from collecting inside said receiver chamber;
   said receiver chamber and said ball being configured to prevent any unwanted dropping of said assembly during towing;
   said rear mounting plate being shaped to afford a best fit between said towed vehicle and said towing vehicle; and
   said upper portion, said angled sidewall and said pair of fastening means being configured to allow rapidly disconnecting said trailer hitch ball assembly by depressing said latch pins and then slidably removing said pair of fastening means from said plurality of receiver side openings.

2. The trailer quick disconnect sand-resistant ball mount assembly, as recited in claim 1, further comprising said towed vehicle being a trailer.

3. The trailer quick disconnect sand-resistant ball mount assembly, as recited in claim 2, further comprising:
   said latch pins preventing said pair of fastening means from sliding out of said plurality of receiver side openings;
   said pair of fastening means being configured to be inserted within said upper portion only when said ball is properly seated; and
   said pair of fastening means providing a visual confirmation that said ball is properly seated within said upper portion.

4. The trailer quick disconnect sand-resistant ball mount assembly, as recited in claim 3, further comprising said pair of fastening means being a pair of keeper pins.

5. The trailer quick disconnect sand-resistant ball mount assembly, as recited in claim 1, further comprising said shaft being a threaded shaft.

6. A method for securely hitching a trailer with the quick disconnect sand-resistant ball mount assembly, comprising the steps of:
   forming a receiver housing with a receiver chamber, a rear mounting plate and a plurality of receiver side openings, said receiver chamber having a closed spherical upper portion and an angled sidewall;

providing said rear mounting plate with a plurality of mounting apertures to attach said receiver housing to a towing vehicle;
forming a trailer hitch ball assembly with a ball and a shaft, said shaft protruding downward;
connecting said shaft to a towed vehicle;
dimensioning said upper portion and said angled sidewall to permit a precise alignment of said ball inside said receiver chamber;
inserting said ball into said receiver chamber, said ball being held within said receiver chamber by said upper portion and said angled sidewall while providing a full range of motion for said towed vehicle;
extending a pair of means for fastening through said plurality of receiver side openings and into said receiver chamber;
placing said pair of fastening means snugly underneath said ball to securely hold said ball inside said receiver chamber, each of said fastening means having a latch pin;
causing road dust and debris to harmlessly drop downward during towing by virtue of said angled sidewall to prevent an unwanted and hazardous accumulation of road dust and debris inside said receiver chamber;
shaping said rear mounting plate for a best fit between said towed vehicle and said towing vehicle; and
configuring said upper portion, said angled sidewall, and said pair of fastening means to allow rapidly disconnecting said trailer hitch ball assembly by depressing said latch pins and then slidably removing said pair of fastening means from said plurality of receiver side openings.

7. The method for securely hitching a trailer with the quick disconnect sand-resistant ball mount assembly, as recited in claim 6, wherein said towed vehicle is a trailer.

8. The method for securely hitching a trailer with the quick disconnect sand-resistant ball mount assembly, as recited in claim 7, further comprising the steps of:
preventing said pair of fastening means from sliding out of said plurality of receiver side openings with said latch pins;
configuring said pair of fastening means to be inserted within said upper portion only when said ball is properly seated; and
providing a visual confirmation that said ball is properly seated within said upper portion by said pair of fastening means.

9. The method for securely hitching a trailer with the quick disconnect sand-resistant ball mount assembly, as recited in claim 8, wherein said pair of fastening means are a pair of keeper pins.

10. A trailer quick disconnect sand-resistant ball mount system, comprising:
a receiver housing having a receiver chamber, a rear mounting plate and a plurality of receiver side openings, said receiver chamber having a closed spherical upper portion and an angled sidewall;
said rear mounting plate having a plurality of mounting apertures to attach said receiver housing to a towing vehicle;
a trailer hitch ball assembly having a ball and a shaft are connected to a towed vehicle, said shaft protruding downward;
said upper portion and said angled sidewall, being dimensioned to permit a precise alignment of said ball inside said receiver chamber, holds said ball within said receiver chamber while providing a full range of motion for said towed vehicle;
a pair of means for fastening extends through said receiver side openings, into said receiver chamber and fits snugly underneath said ball to securely hold said ball inside said receiver chamber, each of said fastening means having a latch pin;
said upper portion and said angled sidewall, being tapered upward, cause an unwanted accumulation of sand, road dust, and other debris to harmlessly drop downward during towing to prevent said unwanted accumulation of sand, road dust, and other debris from collecting inside said receiver chamber;
said receiver chamber and said ball being configured to prevent any unwanted failure of said system during towing;
said rear mounting plate being shaped to afford a best fit between said towed vehicle and said towing vehicle; and
said upper portion, said angled sidewall and said pair of fastening means being configured to allow rapidly disconnecting said trailer hitch ball assembly by depressing said latch pins and then slidably removing said pair of fastening means from said plurality of receiver side openings.

11. The trailer quick disconnect sand-resistant ball mount system, as recited in claim 10, further comprising said towed vehicle being a trailer.

12. The trailer quick disconnect sand-resistant ball mount system, as recited in claim 11, further comprising:
said latch pins preventing said pair of fastening means from sliding out of said plurality of receiver side openings;
said pair of fastening means being configured to be inserted within said upper portion only when said ball is properly seated; and
said pair of fastening means providing a visual confirmation that said ball is properly seated within said upper portion.

13. The trailer quick disconnect sand-resistant ball mount system, as recited in claim 12, further comprising said pair of fastening means being a pair of keeper pins.

14. The trailer quick disconnect sand-resistant ball mount system, as recited in claim 13, further comprising said shaft being a threaded shaft.

\* \* \* \* \*